Sept. 15, 1970 R. W. McPHERSON 3,528,546
WATER SENSITIVE FLOW MONITOR

Filed Sept. 11, 1968 2 Sheets-Sheet 1

INVENTOR.
ROBERT W. McPHERSON
BY
Wilson & Fraser
ATTORNEYS

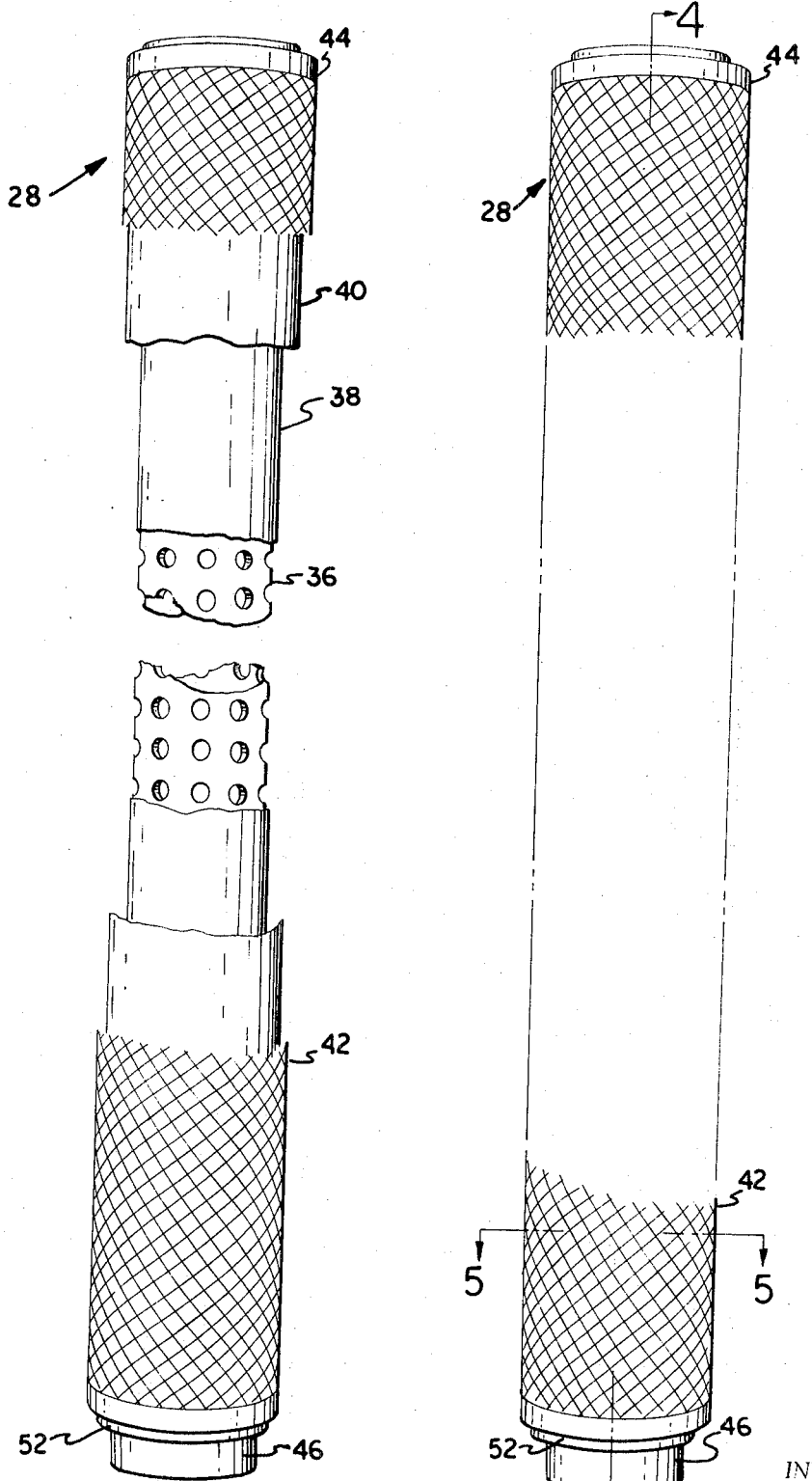

United States Patent Office 3,528,546
Patented Sept. 15, 1970

---

3,528,546
WATER SENSITIVE FLOW MONITOR
Robert W. McPherson, Danville, Calif., assignor to Velcon Filters Inc., San Jose, Calif., a corporation of California
Filed Sept. 11, 1968, Ser. No. 759,071
Int. Cl. B01d 39/06
U.S. Cl. 210—96       5 Claims

ABSTRACT OF THE DISCLOSURE

A water sensitive filter and flow monitor for sensing the presence of free water in a transient flow of fluid comprising an inlet for the fluid to be monitored, an outlet for the the monitored fluid, and a mass of water swellable granular material; for example bentonite, disposed between the inlet and outlet through which the fluid is caused to pass. Upon the presence of a predetermined concentration of water in the fluid being tested, the water swellable granular material will swell to completely block the flow of any fluid therethrough.

BACKGROUND OF THE INVENTION

Present day fuel employed for aircraft is typically of a high quality; however, the aircraft fueling systems and equipment are not without faults. Even though efficient filtration and water separation equipment is employed whenever fuel is transferred from one point to another point, so that under normal operating conditions the fuel will be dispensed with a low solids content and practically no undissolved or free water content, there is no guarantee that each aircraft refueled has acceptable fuel under all conditions and at each refueling.

Fuel water separator systems include some type of coalescer and filter separator elements which retain the solid contaminants contained in the fuel flowing through the system and are effective to coalesce and remove the water content therein. In removing the solid contaminants of the transient fuel, the elements gradually offer increased resistance to the flow of fuel until the attained pressure drop across the element becomes greater than the system pressure can attain. In the event the element is not replaced before this occurrence, the element will malfunction and discharge into the aircraft fuel tanks a large quantity of contaminants, both solid and water. Also, it has been found that in certain instances, the fuel being passed through the fuel water separators may contain surfactants and the like, causing the coalescer elements to be inoperative or ineffective in coalescing and removing the water content of the fuel.

It will be appreciated that aircraft operation with such contaminated fuel could prove disastrous, since normal airborne filters are designed to merely remove small traces of solid contaminants and no water. Large amounts of contaminants will quickly plug up these airborne filters, causing the bypass valves in the filters to open, allowing the contaminated fuel to adversely wear the associated pumps, plug the servos of the fuel control, and to permit the water in the fuel to freeze in the fuel lines causing engine malfunction, thereby endangering life and property.

It is an object of the present invention to produce a water sensitive filter and flow monitor which will block the flow of fuel containing an unacceptable concentration of free water therein.

Another object of the invention is to provide a water sensitive filter and flow monitor which will react immediately to contamination passing therethrough by registering an increase in pressure differential, and completely blocking the flow therethrough at normal operating pressures.

A further object of the invention is to produce a water sensitive filter and monitor which will not offer an excessive pressure drop to flow when operated with fuel of acceptable contamination levels.

SUMMARY

The above objects and advantages of the invention may be achieved by a water sensitive fluid flow monitor comprising an inlet for the fluid to be monitored; an outlet for the monitored fluid; a confined passageway establishing communication between the inlet and the outlet; and a mass of water sensitive granular material swellable upon the pressence of water to block the flow of fluid between the inlet and the outlet.

BRIEF DESCRIPTION OF THE INVENTION

Other objects and advantages of the invention will become manifest to those skilled in the art by reading the following detailed description of an embodiment of the invention when considered in the light of the accompanying drawings, in which:

FIG. 2 is an elevational view of a water sensitive flow monitor of the type illustrated in FIG. 1;

FIG. 3 is an elevational view similar to FIG. 2 with portions cut-away to more clearly illustrate the structure;

DESCRIPTION OF PREFERRED EMBODIMENT

Figures 1, 4, 5:
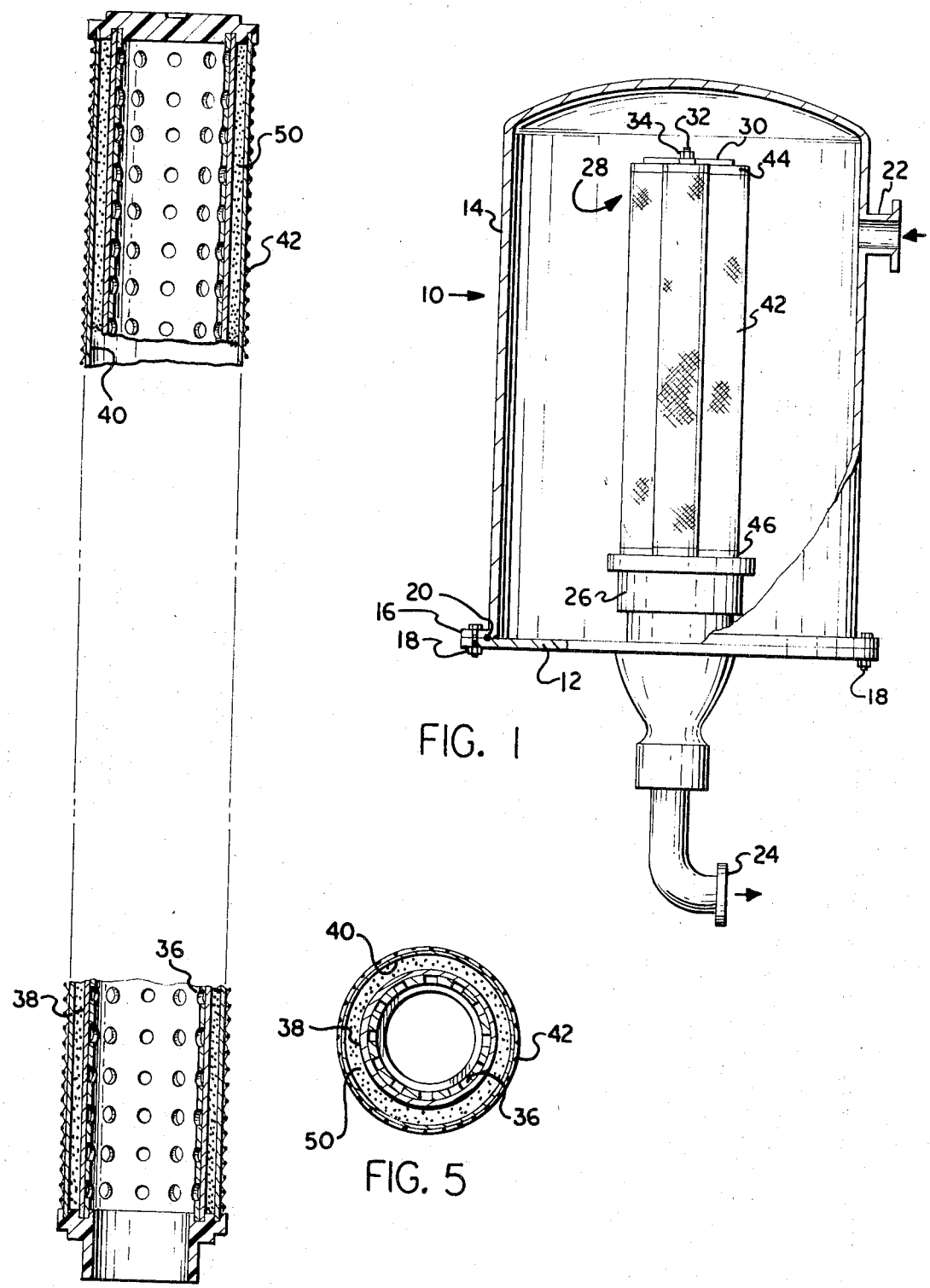
FIG. 1 is a sectional view of a fuel monitoring device incorporating the water sensitive flow monitors constructed in accordance with the invention.
FIG. 4 is a sectional view taken along line 4—4 of FIG. 2.
FIG. 5 is a sectional view taken along line 5—5 of FIG. 2.

Referring to FIG. 1 of the drawings, there is illustrated a vessel generally indicated by reference numeral 10 having a base member 12 and an upper closure 14. The open end of the upper closure 14 is provided with an outwardly extending flange 16 provided with an array of apertures alignable with similar apertures in the base member 12 to receive nut and bolt fastening means 18. To produce a fluid-tight seal between the base member 12 and the upper closure 14, a gasket ring 20 is provided. It will be apparent that access can be had to the interior of the vessel 10 by removing the nut and bolt fastening means 18 and removing the upper closure 14 from the base member 12. The vessel 10 is provided with a fluid inlet 22 and a fluid outlet 24.

A manifold 26 is mounted on the base member 12 in communication with the outlet 24. A plurality of water sensitive fluid flow monitors or fuse elements 28 is suitably attached to the base member 12 and retained in position by a retainer plate 30 which is operatively connected to the base member 12 by an upstanding bolt 32 and an associated nut 34. The direction of fluid flow through the vessel 10 is indicated by the arrows. Each of the fuse elements 28, as clearly illustrated in FIGS. 2, 3, 4 and 5, is provided with a perforated center tube 36 which may be formed of a resin impregnated paper stock. Several wraps 38 of resin impregnated paper having a porosity of approximately 2 microns are formed on the outer surface of the center tube 36. A second wrap 40 of the same type of resin impregnated paper as the wrap 38 is formed in concentric spaced relation from the wraps 38. Excellent results have been obtained by employing a paper stock which includes glass fibers, wood pulp, and cotton linters. The substituents are bonded together by a water resistant resin to provide approximately a two micron porosity.

Formed about the entire outer surface of the outermost wraps 40, there is a plastic cylindrical screen 42 of rather large mesh. The material used in fabricating the cylindrical screen 42 must be inert to the fluids being treated and polyethylene has been found satisfactory for use with hydrocarbon fluids such as jet aviation fuel. It has been found desirable to employ the outermost plastic screen 42 to impart structural integrity to the over-all element. The upper end of the assembly, thus far dscribed, is closed off by a plastic end cap 44, while the opposite end is provided with an aperture plastic end cap 46. Before the end cap 46 is formed, and after the formation of the end cap 44, a granular water swellable material 50 is poured into the space between the outer surface of the wraps 38 and the inner surface of the wraps 40. The space therebetween is completely filled and to assure proper filling, the assembly may be vibrated to cause the granular material 50 to evenly compact. Finally, an adequate amount of a quick-set resin, for example, is disposed in the open end of the material 50 and after this material is set, the assembly is turned over and a lower end is provided with a suitable end cap 46. Then the annular sealing gasket 52 is applied to the outer surface of the end cap 46 to assure a liquid-tight contact between the element 28 and the manifold 26.

The end caps 44 and 46 are each formed in a similar fashion, by disposing the respective end of the assembly in a suitable die employing a suitable hardenable resin material therein. The end portions of the center tube 36, paper wraps 38 and 40, and the screen 42 are actually immersed into the plastic material while it is in liquid form. The resin is then allowed to set or cure, and thereafter the assembly is removed from the end cap forming die. As pointed out hereinabove, the end caps 44 and 46 are typically formed in two separate operations. Satisfactory results have been achieved by forming the end caps of a polyester resin which is inert to the fluid being treated, after it has been set and cured.

It has been discovered that excellent results have been achieved by using bentonite for the granular water swellable material 50, such as, for example, a product commercially available under the trademark "Volclay" manufactured and sold by American Colloid Company. In one example, the material 50 was in bead form of approximately 1/32 of an inch in diameter.

In operation, the fluid to be treated, such as JP-4 or JP-5 jet fuel, is caused to enter the vessel 10, illustrated in FIG. 1, through the inlet 22, and is then caused to flow to the outlet 24 through the monitor or fuse elements 28. It will be noted that the fluid flow is from the outside to the inside of the fuse elements 28, and thence to the outlet 24 through the manifold 26. Typically the system illustrated in FIG. 1 is disposed in fluid communication between a water fuel separator unit and an aircraft to which clean dry fuel is to be delivered. It will be appreciated that the system can be stationary in nature, or can be mounted in a refueler vehicle and be in integral part of a mobile refueling system. In any event, during the operation of the system, the monitor or fuse elements 28 are inert to clean dry fuel containing no undissolved water. When traces or slugs of free water in excess of a predetermined level pass into the vessel 10, the monitor or fuse elements 28 will sense the contamination immediately and register a practically instantaneous increase in pressure drop. This pressure drop occurs because the indivdual granules of the material 50 apparently soften and tend to join with other adjacent granules to form a composite mass having continuously decreasing pore sizes between adjacent granules until the pores are completely closed, completely cutting off the flow of fuel therethrough. The bursting strength of the elements 28 is greater than the average system pressure output. The system, therefore, permits acceptable dry fuel to pass therethrough, but once undesired water content is present, the elements 28 will close, thereby militating against the passage of any fluid therethrough. Accordingly, the invention has produced a fuel monitoring system employing a granular material which will permit acceptable fuel to pass, but once contaminated fuel is present, the system completely blocks any flow therethrough.

In conclusion, it will be appreciated that the invention is effective to sense the presence of contamination in the fuel by increasing the resistance to flow through the system, which increase is noted by reading an associated pressure gauge. Also, continuing flow of the contaminated fuel will cause the monitor or fuse elements 28 to completely block the flow of any fluid therethrough.

The number, length, and diameter of the monitor or fuse elements 28 within a vessel 10 will determine the flow rating of the over-all system.

A further feature of the invention is that while the elements 28 are particularly sensitive to free water content of the transient fluid, it will be appreciated that particulate contaminants in the fluid being treated will be removed from the transient fluid and blocked by the paper layers 40.

In conclusion, it will be seen from the above description that the water sensitive fluid flow monitoring device is simple in construction and inexpensive to manufacture, and is reliable to stop the flow of a fluid if it contains an amount of free water over a predetermined level.

In accordance with the provisions of the patent statutes, I have explained the principle and mode of operation of my invention and have illustrated and described what I now consider to represent its best embodiment. However, I desire to have it understood that within the spirit and scope of the appended claims the invention may be practiced otherwise than as specifically illustrated and described.

I claim:
1. A water sensitive flow monitor element for use in a system for sensing the presence of water in a transient fluid, the system including a vessel having a fluid inlet and a fluid outlet, the improvement comprising:
   a mass of water sensitive granular bentonite-like material, said material permitting the passage of hydrocarbon fluids therethorugh while swelling upon the presence of free water;
   fluid pervious means disposed within the vessel for containing said mass or granular material, said means including a pair of coaxial spaced apart cylindrical wraps of filter material defining a space therebetween for containing said mass of water sensitive granular material, and a fluid pervious tube adjacent the innermost surface of the inner one of said cylindrical wraps.
2. The invention defined in claim 1 wherein said fluid pervious means includes: a cylindrical fluid pervious screen formed about the outermost surface of the outer one of said cylindrical wraps.
3. The invention defined in claim 2 wherein said screen is plastic.
4. The invention defined in claim 3 wherein said screen is a polyethylene plastic material.
5. The invention defined in claim 4 including a solid plastic end cap closing off one end of said cylindrical fluid pervious means, and an apertured plastic end cap closing off the other end of said cylindrical fluid pervious means.

References Cited
UNITED STATES PATENTS

| | | | |
|---|---|---|---|
| 2,181,608 | 11/1939 | Russell et al. | 210—502 X |
| 2,283,174 | 5/1942 | Bates et al. | 210—502 X |
| 2,369,857 | 2/1945 | Russell et al. | 210—502 X |
| 2,388,616 | 11/1945 | Lanne | 210—41 |

JOHN W. ADEE, Primary Examiner

U.S. Cl. X.R.
210—484, 489, 502